Aug. 11, 1925.
C. H. CLARK
1,549,344
MOTION PICTURE CAMERA
Filed Jan. 11, 1921
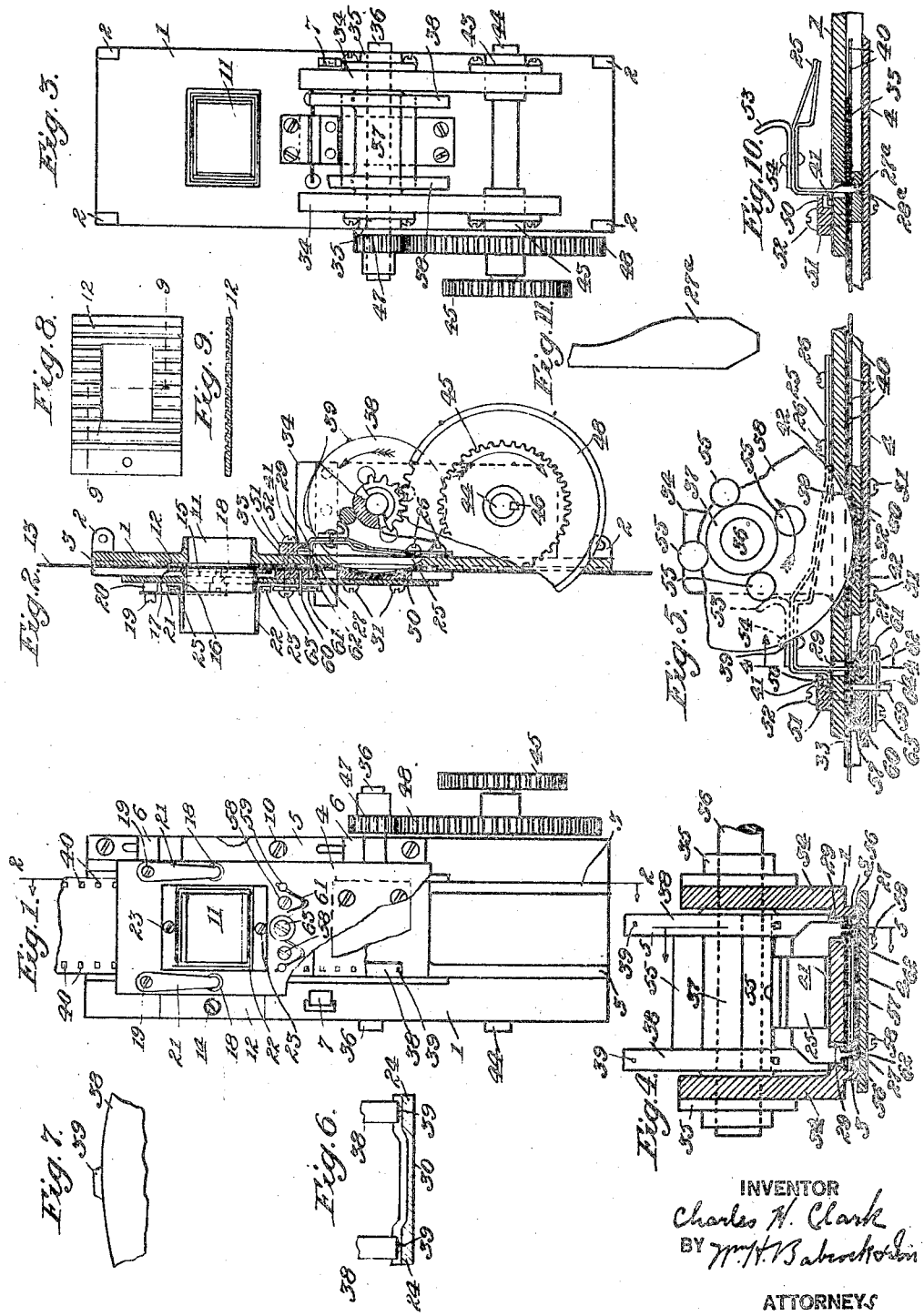
INVENTOR
Charles H. Clark
BY *W. H. Babcock*
ATTORNEYS Patented Aug. 11, 1925.

1,549,344

UNITED STATES PATENT OFFICE.

CHARLES H. CLARK, OF NEW YORK, N. Y.

MOTION-PICTURE CAMERA.

Application filed January 11, 1921. Serial No. 436,508.

*To all whom it may concern:*

Be it known that I, CHARLES H. CLARK, a citizen of the United States, residing at New York, in the county of New York and State of New York, have invented certain new and useful Improvements in Motion-Picture Cameras, of which the following is a specification.

This is a continuation in part of my application Ser. No. 392,969, filed June 30, 1920.

This invention relates to motion picture cameras of the ultra-speed type, and has to do especially with the mechanism for pulling or feeding the film past the shutter opening, and associated mechanism for intermittently stopping and correctly positioning the film strip, and has for its chief objects to provide means to pull or feed such film by a rotary mechanism, to so combine the parts that the exact point at which the film is released and comes to rest is determined by one or more stops, to so construct the parts that the central portion of the film is free from frictional contact with metal parts which tend to scratch the film and cause static electricity, to prevent buckling of the film and to guard against rebounding of the film when run at high speeds, all of which objects, among others, are accomplished by the construction, combination and arrangement of parts hereinafter described and shown by way of example only, it being understood that the invention is capable of embodiment in many other forms not herein shown or specifically described.

In the accompanying drawings:

Figure 1 represents a front elevation of a motion picture camera with the preferred form of my invention applied thereto;

Figure 2, a sectional view through the front plate of said camera, on the line 2—2 of Figure 1, looking in the direction of the arrows, and showing the driving gears, feed rotor or puller in side elevation, partially broken away and sectioned, and their shafts in end elevation;

Figure 3, a rear elevation of the front plate;

Figure 4, an enlarged sectional view of the front plate on the line 4—4 of Figure 5, looking in the direction of the arrows, and showing the feed rotor in elevation;
Figure 5, an enlarged sectional view on the line 5—5 of Figure 4, looking in the direction of the arrows, and showing an end view of the rotor partially broken away, and a side elevation of the film stop mechanism;

Figure 6, an enlarged detail sectional view taken on the line 6—6 of Figure 5, looking in the direction of the arrows, and omitting all parts except the segment plate and a portion of the rotor with a pair of teeth to illustrate the path of travel of said teeth with relation to the ribs of said sector plate;

Figure 7, a side elevation of one of the rotor flanges, broken away, and on a very enlarged scale to show the preferred form of the teeth;

Figure 8, a rear elevation of plate 12;

Figure 9, a section on the line 9—9 of Figure 8;

Figure 10, an enlarged sectional view, similar to Figure 5, showing a modified form of stop mechanism; and Figure 11 a greatly enlarged detail view of the end of the stop projections $52^a$ of the modification illustrated in Figure 10.

Referring now in detail to the drawings, 1 designates a section, preferably of metal, of that portion of a motion picture camera frame which embodies in its construction the shutter opening 11 and mechanism for drawing the film past said opening, and it is provided with perforated lugs 2 for fastening it to the rest of the camera frame by any usual and suitable fastenings, and is further provided with film guide ribs 3 preferably made integral with it. A clamp 5 is secured to plate 1 by any suitable means, such as screws 10, and to this clamp 5 is preferably hinged or journaled the lid or door 4 by means of hinges or journals 6, this door or lid 4 being normally held closed over the faces of guides 3 by the spring catch 7, which may be mounted, as shown, by screws on one of the brackets 34 which may be made integral with the plate 1 as shown. The shutter opening 11 in plate 1 is preferably defined by the edges of an apertured steel plate 12 against which the film 13 rests as it passes the shutter opening 11, said plate preferably being separable from the plate 1, and secured to said plate 1 by screws 14 on one side and the clamp 5 on the other side. Some camera operators prefer to use a film commercially known as X. Back negative to eliminate static electricity. This negative has a gum-like substance that gathers on flange 17 and plate 12, causing scratching of the film when run at high speeds and even at slow speeds occasionally. To eliminate this I corrugate the face of flange 17 and the opposing face of plate 12 by cutting shallow grooves in the opposing faces of said two parts to form registering opposed ribs, such grooves being sufficient in depth and of such number as to permit this substance to freely pass through said grooves without sticking to the face of flange 17 or plate 12.

The lid or door 4 has a shutter opening 15 which registers with shutter opening 11, and a shutter frame, comprising preferably an extension collar 16 and a smooth flange 17 with rounded outer edges on its bearing face, is so arranged that its collar fits loosely in shutter opening 15 to position said frame, and its flange 17 bears against film 13 and presses it against plate 12, the flange 17 being provided with two screws 18 which project through perforations in the door or lid 4 and have their heads engaged by leaf springs 21 held respectively between the respective spacing washers 20 and the heads of the respective screws 19, this arrangement providing a delicate floating spring tension device. This lid or door 4 will preferably be provided with a shutter opening extension frame 22 surrounding and being flush with the edges of the shutter opening 15, this frame 22 preferably being a separate piece mounted on the lid or door by any usual means, such as screws 23. Secured to the inner side of the door or lid 4, preferably by any usual means, such as screws 31, is a plate 30 having a concave recessed segmental inner face, the cord of the segment in which is preferably three quarters of an inch in length, thus corresponding in length to the width dimension of a standard motion picture as now commercially well known, the edges of the plate 30 being rounded slightly to avoid abrupt bending of the film 13 as it enters the segment. The segmental plate 30 is provided on its concaved segmental face with two slightly raised ridges or ribs 24 which follow the contour of the segment and are located respectively at the side edges thereof to be in registry with the two lateral rows of perforations 40 of the well known commercial film 13. There is therefore no opportunity for the bulk of the portion of the film between its two rows of perforations 40 to come into contact with the plate 30. Also, the front faces of the ribs 24 are to be spaced at an interval of approximately one sixty-fourth of an inch from the periphery of the flanges 38 of the rotor 37 or a very slightly greater interval so that the points of the teeth 39 on said flanges 38 will just barely clear said ribs 24, this spacing allowing ample clearance for the film to bend as it leaves the central part of the segment, while not permitting it to buckle or to ride off of the teeth 39. A plate 33 is secured to frame 1 by any suitable means and provided with bevel edges 42, said edges fitting closely between the film 13 and the peripheral faces of flanges 38 to act as guides and deflectors for the film strip, the said bevel edges being spaced so as to just clear the points of the teeth 39 and the outer peripheral faces of the flanges 38. Brackets 34 are provided with registering perforations in which are preferably arranged two pairs of bearings 35 and 43 respectively, the bearings of each pair having a common axial line, and all of said bearings being secured in said brackets 34 by any usual and suitable means. A shaft 36 is mounted to rotate in the bearings 35 and a rotor 37 is firmly secured to said shaft to turn therewith between said brackets 34, and outside of said brackets a driven wheel 47 is firmly mounted on said shaft 36 to turn therewith. A shaft 44 is mounted in bearings 43 and provided with a large drive wheel 48 mounted thereon to turn therewith and is to have drive connection, which may be by gear teeth, as shown, with the smaller driven wheel 47 on the shaft 36, and a driven wheel 45 is connected to the end of the shaft 44 to turn therewith by any ordinary and usual means, which may be a key 46, and is to be driven by any ordinary and suitable gearing. The rotor 37 has two spaced apart, preferably, though not necessarily, integral annular flanges 38, the interval between them corresponding approximately to the interval between the two rows of perforations 40 near the edges of the now well known and illustrated commercial film strip 13, and mounted in the periphery of each flange 38 are four teeth 39 spaced equi-distantly around the said flanges, both flanges being of the same diameter and the teeth of the flanges registering, and all of said teeth extending approximately one sixty-fourth of an inch from the peripheral face of their respective flanges, said teeth being longitudinally arranged in pairs and being placed in the proper longitudinal positions on the flanges 38 to properly mesh into the perforations 40 of the standard motion picture film 13 above referred to. The operative faces of each of these teeth 39 are formed on an angle sufficiently great to permit the teeth to freely slide out of the perforations 40 at the point of disengagement, but not great enough to cause the teeth to wedge the film firmly against the face of the segment in the plate 30 and prevent free movement of the film through the segment with the teeth which engage and pull it the required three quarters of an inch distance between each interval of shutter exposure.

Teeth having faces at an angle of approximately 45 degrees have been found to meet with all requirements.

A stop 25, preferably, though not necessarily, constructed of laminated steel springs has one end secured to frame 1 by screws 26. In the present embodiment stop 25 consists of two steel springs riveted together, the inner one of which has two projections 27 preferably made integral with its free end, said projections being adapted to project through close fitting openings 28 in plate 33, which openings register with larger openings 29 in plate 1. The projections 27 register with perforations 40 in film 13 and are long enough to extend through the film 13 and into holes 62 in the ribs 56 of plate or block 57 to cause the film to stop when released from teeth 39 after being pulled the required distance. In the operation of the stop 25 it is of importance that the projections 27 shall have come to a full stop before the film strikes them, in order that the lateral movement of the stop may not cause the rapidly traveling film to buckle, also, it is important that the projections 27 shall be braced on either side of the film by the walls of the holes or openings 28 and 62 before the film strikes such projections 27 in order that said projections may not be bent or otherwise damaged by the fast traveling film. The outer spring of stop 25 has a projection 41 on its free end which engages a projection 50 on a block 51 secured to frame 1 by screws 52 to limit the outward movement of the stop 25 and its projections 27. Sufficient movement is allowed projection 41 to permit the projections 27 to engage and disengage the film 13 when the stop 25 is forced in and out by the rotor 37. A striking plate 53 is mounted on stop 25 by rivets 54 and is adapted to be engaged by cam pins 55, which may be integral with the rotor 38. The block 57 is secured to the inner face of plate or door 4 by screws 58, sufficient clearance space only being allowed between the ribs 56 on block 57 and the plate 33 for the film 13 to freely slide between them. The central portion of the front face of the block 57 between its ribs 56 is recessed or cut away to prevent its coming into contact with the film 13.

Ratchet pins 59 are slidably mounted in openings or holes extending through lid or door 4, plate 57 and its ribs 56 and are in register with the openings 40 in film 13, and are so placed and so arranged that the beveled ends 60 of said pins 59 will project into perforations 40 of film 13 and prevent the film from rebounding after it strikes against projections 27 on stop 25. A spring 61 is secured to the back of lid 4 by screw 63, the two free ends of said spring passing through openings 64 in ratchet pins 59 and being adapted to press the pins 59 against the film 13 as the film sections between perforations 40 slide past the beveled ends 60 and force the ratchet pins 59 outward against the action of their spring 61.

The rotor is so mounted that the points of the teeth 39 fit very closely to, but do not touch, the faces of the ribs 24 of the segment in plate 30, which segment is shaped to conform to a circle described by the points of the teeth 39 passing through it. The distance between the peripheral faces of flanges 38 and the ribs 24 of the segment face, being approximately one sixty-fourth of an inch, allows ample clearance for the standard film to pass between such opposed surfaces without binding and the distance through the segment is such that the perforations 40 always register with the edges 32 of plate 30 during the exposure period, thus permitting the teeth 39 to freely enter the perforations regardless of which direction the rotor is rotating in.

The diameter of each flange 38 is approximately two inches in the embodiment illustrated and four teeth 39 are mounted in each flange and spaced equidistantly from each other, the teeth on the two flanges being in axial alignment with each other.

The operation of the embodiment illustrated in Figures 1 to 9 inclusive is as follows: the rotation of the gear 45 and gear 48 in a clockwise direction will serve to rotate gear 47 and rotor 37 in a counter-clockwise direction. The teeth 39, which are in mesh with perforations 40 near the respective side edges of the film 13, will force or pull the film downward or forward, the angle of the face of the teeth, from a line passing through the center of each respective tooth and the center of the rotor, being great enough to force the film away from the faces of the flanges 38 against the faces of the ribs 24 of the segment as the teeth pass through said segment, while the clearance between the ends of said teeth and the faces of said ribs is too small to allow the film to slip over the ends of the teeth, and the film thus travels with the teeth through the segment until the curved edge 32 is reached, where the film slips over the end of the tooth and comes to rest for the exposure period.

The number of exposures per rotation of the rotor and the relative length of the periods of exposure and non-exposure will, of course, vary in accordance with the number of teeth or groups of teeth on the respective flanges of the rotor, the period of exposure increasing in accordance with the decrease in the number of teeth or groups of teeth. Also, the length of the cord of the segment will, of necessity, vary in accordance with the number of teeth in each group, the length of the cord of the segment, where a single tooth to a group is used, being approximately three fourths of an inch, where two teeth to the group are used, it will be approximately nine sixteenths of an inch, where three teeth to the group are used it will be approximately six sixteenths of an inch, and where four teeth to a group are used it will be approximately three sixteenths of an inch.

For most purposes it is desirable to have an ultra speed camera take pictures at a speed of about one hundred and twenty-eight pictures per second and to have as much exposure as possible. In the present embodiment shown in Figures 1 to 9 inclusive, if the gears 45 and 48 be rotated at a speed of eight revolutions per second, which may be easily accomplished with any usual and well known gearing the rotor 37 and gear 47, which is four times smaller than the gear 48, will make thirty-two revolutions per second and, since the rotor 37 is provided with four pairs of teeth 39, the rotor will intermittently feed the film one hundred and twenty-eight times per second.

When the camera and feed mechanism is operated at anything like the above rate the speed of feed or travel of the film becomes excessive and it is difficult to properly control the film, so that it becomes necessary to make the projections 27 relatively thin so that they may enter the perforations 40 and come to rest in engagement with the metal walls of the perforations or holes 28 and 62 on the respective sides of the film and so be properly braced and motionless before the film 13 contacts with said projections 27 and has its downward movement thereby stopped. The film strikes the projections 27 with considerable force and, but for the closely positioned faces of ribs 56 of block 57, would buckle and slide over the ends of the projections 27 and continue on for a considerable distance before coming to rest. However, since it cannot buckle, and because of the arrangement above stated, it rebounds unless means to prevent such rebounding are provided. I have, in order to prevent such rebounding, provided the ratchet pins 59 above the projections 27, these ratchet pins 59 having their ends 60 beveled to permit only downward feeding of the film and being pressed by their spring 61 into the perforations 40 of the film 13, are properly spaced from projections 27 so as to register with a set of perforations 40 of the film 13 when the projections 27 are positioned in a lower set of perforations of said film, so that when the perforations 27 enter the lower set of perforations 40 to prevent downward movement, the ratchet pins 59 enter the upper set of perforations 40, as mentioned and prevent rebounding upward movement, the two sets of stop devices co-operating to hold the film momentarily motionless and correctly positioned during the exposure period.

The cams 55 are so arranged that they force the stop 25 with its projections 27 to engage the film 13 immediately after it is disengaged from the teeth 39 in its downward movement, and the plate 53 is so shaped and placed that the stop is permitted to disengage the cams and the film for a considerable period before the next set of teeth 39 enter the film and pull it downward, making it possible to use a stop 25 having but slight spring tension which will not appreciably retard the speed of the rotor, and which will have ample time to disengage itself from the film at high speeds of operation of the camera.

However, in case it is not intended to operate the camera at high speeds, I find that a modified form of stop mechanism may be used with gratifying results, taking the place of the now common spring tension devices and thus eliminating much friction. In this modified form, illustrated in Figures 10 and 11, the ratchet pins 59 and their spring 61 are dispensed with and in place of the projections 27 I substitute the projections 27$^a$ which are made equal in thickness at their bases to the width of the perforations 40 of the film 13 and are thus capable of positioning the film, when fed in either direction, when forced into it immediately preceding the exposure period, and have their free ends formed with converging edges and a blunt tip to ensure free entry of the projections into the perforations 40 without damage to the film. Also, in place of the holes 28 in the plate 57 I substitute holes 28$^a$, which correspond in size to the size of, and receive, the projections 27$^a$. The omission of the ratchet pins 59 from this modified form permits the feeding of the film in either direction.

Otherwise the construction and operation are the same as in the preferred form.

In motion picture cameras of any make, friction of the camera mechanism is eliminated as much as possible, as such friction, especially at high speeds, causes static electricity, makes scratches in the film and limits the speed at which the film can be pulled through the mechanism without causing damage to the film perforations. In the present embodiments all pressure against the film has been eliminated outside of the usual small pressure against the aperture plate 12. The film may touch plate 33, but is not pressed against it at any point and as an extra precaution the central portions of block 57 and plate 30 have been recessed or cut away to provide an extra clearance for the film to freely pass through.

Having thus described my invention, what I claim as new and desire to secure by Letters Patent is:

1. In film feeding mechanism for motion picture cameras, a device for intermittently engaging and feeding the film, in combination with a rigidly fixed non-yieldable plate having non-yieldable ribs, the said plate being recessed between said ribs to avoid contact with the film, and said ribs and means being located on opposite sides of the film and registering with the perforations in said film and with each other and being located at such distance from each other that, with said means in feeding engagement with the film, the said ribs will prevent the film from slipping off of said means before the latter have made their full feeding movement.

2. In film feeding mechanism for motion picture cameras, a device for intermittently engaging and feeding the film, in combination with a rigidly fixed non-yieldable plate having non-yieldable ribs, the said plate being recessed between said ribs to avoid contact with the film, said ribs and means being located on opposite sides of the film and registering with the perforations in said film and with each other, and the said device and ribs being so located with respect to each other as to form a narrow throat through which the film passes, the said ribs serving as a backing to prevent the film from becoming prematurely disengaged from said means.

3. In a motion picture camera intended to be used with a film strip having a series of regularly spaced aligned perforations, means for feeding said film, and positive means for abruptly stopping the travel of said film strip in one direction when said strip is disengaged from the feeding means, in combination with ratchet means in line with said perforations and means for yieldingly pressing said ratchet means toward said film and into said perforations, the intermediate portions of said film between said perforations forcing said ratchet means outward against the action of said yielding means when the film is fed in one direction, but engaging against, and being held against reverse movement by, said ratchet means.

4. In a motion picture camera intended to be used with a film strip having a series of regularly spaced aligned perforations, means for intermittently feeding said film, and means actuated by the feeding means for projecting through one of said perforations to abruptly stop the travel of said strip, in combination with spring pressed means, in advance of said stop means, in the direction of travel of said strip, adapted to engage in one of the perforations of said strip to prevent its rebounding off of said stop means.

5. In a motion picture camera intended to be used with a film strip having a series of uniformly spaced aligned perforations, means for intermittently feeding said film strip and means for abruptly stopping the travel of said film strip in the direction of feed as it is disengaged by said feeding means, in combination with means for preventing rebounding of the film strip from said stop means, said rebound prevention means comprising a plunger arranged in advance of said stop means, in the direction of feed of said strip, and resilient means for forcing said plunger toward said strip and into the perforations thereof, said plunger having its operative end sloping to permit the film strip to force it outward against the action of said resilient means when the film is fed in one direction.

6. In a motion picture camera intended to be used with a film strip having a series of regularly spaced aligned perforations, a feed rotor having a tooth, to intermittently engage and feed said strip, and provided with a cam, in combination with a stop yieldingly held out of the path of travel of the film strip and engaged at regular predetermined intervals by said cam during the rotation of said rotor to project through a perforation in the film strip and stop the forward movement of the latter as it is disengaged from the tooth of the rotor.

7. In a motion picture camera intended to be used with a film strip having a series of uniformly spaced perforations, a plate arranged on one side of the film strip, and a block arranged on the opposite side of the film strip and provided with a rib, the face of which is arranged closely adjacent the plate to prevent buckling of the film strip while allowing ample room for the free passage thereof between the faces of said rib and said plate, and a spring pressed pin working through said rib to engage in said perforations and having its outer face beveled in order that it may ride over the portions of said film strip between the perforations when said strip is fed forward, but cannot ride over said portions in case the film should try to rebound from the stop, in combination with intermittent feed means and a stop.

8. In a motion picture camera intended to be used with a film strip having a series of uniformly spaced aligned perforations, means for intermittently feeding said film strip and means for abruptly stopping the travel of the film strip as it is disengaged by the feeding means, in combination with means for preventing rebounding of the film strip from said stop means, said rebound prevention means comprising a plunger, and means for forcing said plunger toward said strip and into one of the perforations thereof at a point distant lengthwise of said film from said stop means.

9. In film feeding mechanism for motion picture cameras, a plate having a segmental face, in combination with a rotatably mounted device having a portion for engaging the film strip and feeding it forward, the said plate and said device being arranged respectively on opposite sides of the film strip and so closely adjacent to each other that the thickness of the film in the space between them will determine the exact point at which the film strip will come to rest.

10. In film feeding mechanism for motion picture cameras, a plate having a segmental face, in combination with a rotatably mounted device having a portion for engaging the film strip and intermittently feeding it forward, the said plate and said device being arranged respectively on opposite sides of the film strip and so closely adjacent to each other that the thickness of the film strip in the space between them will determine the exact point at which the film will be engaged again by said device.

11. In film feeding mechanism for motion picture cameras, a rotatably mounted device formed with means for intermittently engaging and feeding the film, in combination with a rigidly fixed non-yieldable plate, the said plate and said device being arranged respectively on opposite sides of the film strip and so closely together that the thickness of the film in the space between them will determine the exact point at which the film will be engaged by said means.

12. In a film feeding mechanism for motion picture cameras, a plate having a segmental face, in combination with a rotatably mounted device having a tooth for engaging in the perforations of a row of perforations in the film strip and intermittently feeding said strip forward, the said tooth and row of perforations being in registry, the said device and said plate being located on opposite sides of the film strip and at an interval from each other slightly less than the length of said tooth plus the thickness of the film strip, and the operative face of said tooth being beveled from the forward side of its base, in the direction of rotation of said device, toward its tip, the face of the tooth being so inclined that it will tend to force the film strip away from said means toward said plate, the latter preventing the film strip from riding off of said tooth.

13. In film feeding mechanism for motion picture cameras, a rotatably mounted device formed with a plurality of spaced means for engaging and feeding the film, in combination with a plate having a segmental surface and arranged on the opposite side of the film strip from said device and very close to said device to hold the film strip on said device when the latter is operatively engaging said film strip.

14. In film feeding mechanism for motion picture cameras, a plate having a segmental face, in combination with a rotatably mounted device having teeth for engaging in the perforations in the film strip and intermittently feeding it forward, the operative faces of the teeth being forward with beveled faces having a relatively gradual inclination from a radial line and being of such degree that the film will have a tendency to ride up and off of their tops, and the said plate and device forming a throat between them for the passage of the film and being arranged so closely to each other that the segmental face of the plate will prevent the film strip from riding off of the teeth as they pass through the segment defined by said segmental face.

15. In film feeding mechanism for motion picture cameras, a plate having a segmental face, in combination with a rotatably mounted device having teeth for engaging in the perforations in the film strip and feeding it forward, the operative faces of the teeth being formed with beveled faces having a relatively gradual inclination from a radial line and being of such degree that the film strip will have a tendency to ride up and off their tops, and the said plate and device forming a throat between them for the passage of the film strip and being arranged so closely to each other that the segmental face will prevent the film strip from riding off of the teeth as they pass through the segment defined by said segmental face, the ends of the segmental face being rounded to avoid too abrupt bending of the film strip.

16. In film feeding mechanism for motion picture cameras, a plate having a segmental face, in combination with a rotatably mounted device having teeth for engaging in the perforations in the film strip and intermittently feeding it, the operative faces of the teeth being so formed that the film strip will have a tendency to ride up off of their tops, and the said plate and device forming a throat between them for the passage of the film strip and being arranged so closely to each other that the segmental face will prevent the film strip from riding off of the teeth as they pass through the segment defined by said segmental face, the ends of said segmental face being rounded, and means on the same side of the film as said device and located adjacent the rounded ends of the segmental face and acting to deflect the film strip from the face of said device and at a tangent thereto.

17. In film feeding mechanism for motion picture cameras, a movably mounted plate having a segmental face, in combination with a rotatably mounted device having teeth for engaging in the perforations in the film strip and intermittently feeding it, the operative faces of the teeth being formed with beveled faces having a relatively gradual inclination from a radial line and being of such degree that the film will have a tendency to ride up and off of their tops, and the said plate and device normally forming a throat between them for the passage of the film and being arranged so closely to each other that the segmental face of the plate will prevent the film strip from riding off of the teeth as they pass through the segment defined by said segmental face, the said plate being movable away from said feeding device.

18. In film feeding mechanism for motion picture cameras, a rotatably mounted device formed with a plurality of teeth spaced at equi-distant intervals of a circle concentric with the axis of said device for intermittently engaging the film strip and intermittently feeding it, the said teeth each not exceeding one sixty-fourth of an inch from root to tip.

19. In film feeding mechanism for motion picture cameras, a rotatably mounted device formed with a plurality of spaced means for engaging and feeding the film, in combination with a plate normally held rigid and immovable with relation to said rotatable device and arranged on the opposite side of the film strip from said device and very close to said device to hold the film strip on said device when the latter is operatively engaging said film strip.

In testimony whereof, I have signed my name to this specification in the presence of two subscribing witnesses.

CHARLES H. CLARK.

Witnesses:
H. F. BONNEL,
P. T. REILLY.